US008297554B2

(12) United States Patent
Schotte et al.

(10) Patent No.: US 8,297,554 B2
(45) Date of Patent: Oct. 30, 2012

(54) ARRANGEMENT OF A FIRST AND A SECOND FURNISHING

(75) Inventors: Hermann Schotte, Buxtehude (DE); Johannes Gonnsen, Hamburg (DE)

(73) Assignee: Airbus Operations GmbH (DE)

( * ) Notice: Subject to any disclaimer, the term of this patent is extended or adjusted under 35 U.S.C. 154(b) by 48 days.

(21) Appl. No.: 13/020,335

(22) Filed: Feb. 3, 2011

(65) Prior Publication Data

US 2011/0121134 A1    May 26, 2011

Related U.S. Application Data

(63) Continuation of application No. 11/365,323, filed on Mar. 1, 2006, now Pat. No. 7,905,451.

(60) Provisional application No. 60/658,125, filed on Mar. 3, 2005.

(30) Foreign Application Priority Data

Mar. 3, 2005 (DE) .................. 10 2005 009 750

(51) Int. Cl.
*B64D 13/00* (2006.01)
*B64D 11/06* (2006.01)
(52) U.S. Cl. .................. 244/118.6; 244/122 R
(58) Field of Classification Search .............. 244/118.6, 244/118.5, 122 R; 297/234, 232, 244
See application file for complete search history.

(56) References Cited

U.S. PATENT DOCUMENTS

| 2,546,834 | A  | 3/1951  | Pfau |
| 2,993,529 | A  | 7/1961  | Brown |
| 3,394,417 | A  | 7/1968  | O'Link |
| 3,594,037 | A  | 7/1971  | Sherman |
| 4,065,174 | A  | 12/1977 | Yokohama et al. |
| 4,460,215 | A  | 7/1984  | Chamberlain et al. |
| 4,637,081 | A  | 1/1987  | Clark |
| 4,799,632 | A  | 1/1989  | Baymak et al. |
| 4,902,069 | A  | 2/1990  | Lehnert |
| 5,335,963 | A  | 8/1994  | Muller et al. |
| 5,337,676 | A  | 8/1994  | Ahad |
| 5,740,989 | A  | 4/1998  | Daines |
| 5,769,360 | A  | 6/1998  | Kerbis et al. |
| 6,672,662 | B1 | 1/2004  | Balk |
| 6,692,069 | B2 | 2/2004  | Beroth et al. |
| 7,213,882 | B2 | 5/2007  | Dryburgh et al. |
| 2002/0070314 | A1 | 6/2002 | Schmidt-Schaeffer |
| 2004/0051003 | A1 | 3/2004 | Cheung |
| 2004/0140783 | A1 | 7/2004 | Fukuhara et al. |

FOREIGN PATENT DOCUMENTS

| DE | 2643452 A1 | 4/1977 |
| DE | 3822574    | 1/1990 |
| DE | 4125958    | 10/1992 |
| EP | 0 361 717  | 4/1990 |
| GB | 2 288 973  | 11/1995 |
| GB | 2 388 313  | 11/2003 |
| WO | 93/01088   | 1/1993 |

*Primary Examiner* — Rob Swiatek
*Assistant Examiner* — Valentina Xavier
(74) *Attorney, Agent, or Firm* — Lerner, David, Littenberg, Krumholz & Mentlik, LLP

(57) ABSTRACT

An arrangement, includes a first furnishing and a second furnishing, at least one part of the first furnishing being movable in the direction of the second furnishing, and at least one part of the second furnishing being movable to free a space for receiving the at least one part of the first furnishing.

11 Claims, 5 Drawing Sheets

ARRANGEMENT OF A FIRST AND A SECOND FURNISHING

CROSS-REFERENCE TO RELATED APPLICATIONS

This application is a continuation application of U.S. patent application Ser. No. 11/365,323 (now U.S. Pat. No. 7,905,451), filed Mar. 1, 2006, which claims the benefit of U.S. Provisional Patent Application No. 60/658,125, filed Mar. 3, 2005, and of German Patent Application No. 10 2005 009 750.2, filed Mar. 3, 2005, the disclosures of which applications are each hereby incorporated herein by reference.

BACKGROUND OF THE INVENTION

The present invention relates to an arrangement. In particular, the present invention relates to an arrangement of a first furnishing and a second furnishing, as well as a means of transportation.

In commercial transports, in particular means of transportation, providing passengers with sufficient comfort in the transport is often a concern. Sufficient comfort for the passengers means a sufficiently large space offered which may be occupied by the passengers.

A generous and roomy design of an interior makes an especially pleasant impression on the passengers. A compromise must often be made, since every available space and/or any arbitrary surface may not be used for placing passenger seats or making an occupancy area for passengers. Thus, for example, emergency exits must be kept free and may not be considered in the planning, for positioning passenger seats, for example. In addition, extensive safety and supply devices must be placed, because of which further space is not available.

There are furnishings, such as flight attendant seats, which must only be used during the takeoff and landing phases of an aircraft.

A flight attendant folding chair arrangement, which is attached to the wall of an aircraft cabin using multiple individual holders, is known from the patent specification U.S. Pat. No. 4,460,215. Moreover, a cabin attendant seat of thin profile, which folds together automatically when the occupant stands up, is known from patent specification U.S. Pat. No. 3,594,037.

SUMMARY OF THE INVENTION

Amongst other things, it may be an object of the present invention to provide a space-saving arrangement of furnishings.

This object maybe achieved by an arrangement of a first and a second furnishing and by a means of transportation having a corresponding arrangement having the features according to the independent claims.

According to an exemplary embodiment of the present invention, an arrangement of a first and a second furnishing is provided, wherein at least one part of the first furnishing being movable in the direction of the second furnishing, and wherein at least one part of the second furnishing being movable to free a space to receive the at least one part of the first furnishing.

According to another exemplary embodiment of the present invention, a means of transportation having an arrangement comprising the features described above is provided.

It may happen that in partitioned spaces, only limited space is available because of the spatial delimitation. In spite of this, it may be necessary to house different furnishings on this limited available space or room. Furnishings may, for example, be monuments, interior furnishing components, seats, particularly passenger seats, a partition wall, a safety or supply unit, or other furnishings for the aircraft interior.

It may be that a first furnishing is to be movable. Due to the movement, a space or room requirement for the first furnishing may be greater than for a corresponding statically attached first furnishing. The additional room requirement arises because of the deflection which is caused by the movement of at least one part of the first furnishing.

For example, a first furnishing may be seat, particularly a passenger seat. A seat may have a seat surface and a backrest. For a seat, particularly a reclining seat, the seat may have two operating position or modes of operation. A first operating position may be a seated position having an upright backrest, while a second operating position may be a rest position. The rest position may make it possible for the user to assume a reclining position on the seat in a relaxed posture. In this case, the backrest may be folded down to recline. An additional clearance zone may be necessary for the movement of the backrest.

An additional clearance zone may be necessary if a second furnishing is positioned so close to the seat that in the second operating position, the seat, in particular the rest, and the second furnishing do not obstruct one another. Upon a deflection of the seat in the direction of the second furnishing, the proximal arrangement of the second furnishing may obstruct the deflection of the rest.

The space or clearance zone required for the movement, inclination, or deflection of the backrest may result from the dimensions of the seat. For example, at a height of the backrest of approximately 1100 mm, a space of approximately 150 to 230 mm may be necessary.

However, the required clearance zone may be occupied by the second furnishing, for example. The second furnishing may be a partition wall or a flight attendant seat or another monument and/or furnishing element, for example. However, it may be that the second furnishing claims a space and/or clearance zone which would be required for the movement, particularly the pivot and/or inclination movement of a backrest. It may be, however, that the second furnishing must be installed in this obstructing position in order not to block exits, particularly emergency exits and/or areas or surfaces to be kept free.

If the first furnishing, particularly the seat rest, moves toward the second furnishing, such as a flight attendant seat or a partition wall having a flight attendant seat, at least a part of the second furnishing may be movable to free a space for receiving the first furnishing, particularly a part of the first furnishing. In other words, this means that, for example, the second furnishing frees a space which the first furnishing requires. The space or room may be any arbitrary spatial volume perpendicular to the base of the second furnishing in this case.

The space and/or room may be a partial space or three-dimensional partial volume of the room required by the second furnishing. This room may be positioned perpendicular to the base of the second furnishing. The first furnishing and/or a part of the first furnishing may penetrate into this new, freed clearance zone after the space is freed by the second furnishing.

Therefore, a chronological use of the first and second furnishings may be taken into consideration. In this case, time is mapped to a use of the different modes of operation. The two modes of operations of the seats may not occur simultaneously.

For example, the first furnishing may be a flight attendant seat and the second furnishing may be a passenger seat having an at least partially foldable back part and/or a backrest. Particularly in an aircraft and/or in an internal area of an aircraft fuselage, there may be different uses of the flight attendant seat and/or passenger seat at different times. During takeoff and landing, the backrest of the passenger seat should be placed upright. This may be a first mode of operation, for example. During takeoff and landing, the cabin personnel take their places on the flight attendant seats. A flight attendant seat may have a back area, in particular a partition wall, which projects into a spatial area of the aircraft interior.

During the flight, it may occur that the flight attendant seats are not used. The flight attendants normally pursue their activities during the flight. Therefore, their flight attendant seats remain free. During the flight phase, the passengers may be allowed to adjust the backrests of their seats. In particular, an inclination of the backrest may be desired for a rest and/or sleep phase. If the flight attendant seat and the passenger seat are close together, the inclination of the backrest may be obstructed by the space claimed by the flight attendant seat.

However, if the unused flight attendant seat, particularly the partition wall, also particularly a part thereof, may be moved out of the obstructing spatial area, an inclination, particularly a further inclination of the backrest of the passenger seat is possible. The passenger seat may thus be operated in a second mode of operation.

The second furnishing, particularly the flight attendant seat, does therefore not obstruct the first furnishing, particularly the passenger seat having its movable components, such as the movable backrest. Therefore, minimum dimensions of areas, such as occupancy area or entry/exit areas, may be maintained, although any arbitrary area may not be used.

According to a further exemplary embodiment of the present invention, the second furnishing is implemented to free the space automatically. The obstructing part of the second furnishing may thus be automatically removed from the interfering area. For the automatic release, the second furnishing may have a device which recognizes nonuse of the second furnishing, for example, and therefore automatically frees the space occupied by the second furnishing. However, the automatic mechanism may also be triggered by a user.

For example, the second furnishing may have a flap which is folded down by the weight of a user. If the weight of a user falls away, the flap may fold away automatically and cause a movement of at least a part of the second furnishing. However, an automatic mechanism may also be a trigger device, for example, particularly a button or a lever, after whose actuation the movement of the part of the second furnishing is triggered.

Through an automatic mechanism, no additional force or only a slight additional force may be necessary for removing the at least one part of the second furnishing from the obstructing area. The operation of the second furnishing is thus simplified. For example, the automatic release may also be performed using electromechanical converters.

According to a further exemplary embodiment of the present invention, a movement of the at least one part of the second furnishing is coupled to a movement of the at least one part of the first furnishing.

A connection between the movement of the first furnishing and the movement of the second furnishing may thus be produced. The second furnishing may thus provide the required clearance zone for the first furnishing when the second furnishing requires this clearance zone for its movement. It may be a mechanical or an electrical coupling, for example.

The coupled movement between the first and second furnishings does not have to be executed uniformly and/or congruently. This means that a backward movement of the at least one part of the first furnishing may result in a forward movement i.e., in opposite direction, of the at least one part of the second furnishing. In addition, a rapid movement of a part of the first furnishing may also result in a slow movement of a part of the second furnishing and vice versa. For example, joints, gears, or gear wheels may be used in any arbitrary combination to reshape the movement.

According to further exemplary embodiments of the present invention, the second furnishing may be a passenger secondary seat, a partition wall, and particularly a partition wall which has a further furnishing. For example, a further furnishing on the partition wall may in turn be a passenger seat. This means a flight attendant seat may be integrated into a partition wall. A partition wall may be used for the spatial partitioning of an area. It may also be used as an information platform, however. Information such as posters or electronic data may be displayed on the partition wall. A draft for passengers may also be avoided using a partition wall, however. A partition wall may also be used for sound insulation.

According to a further exemplary embodiment of the present invention, the second furnishing may have at least one pivot device, such as a joint, for pivoting the at least one part of the second furnishing. The joint may be positioned between parts of the second furnishing. It may thus be made possible for only a partial area of the second furnishing to be pivoted if additional space is claimed. A joint may allow the second furnishing, particularly a part thereof, to be permanently connected to a floor, particularly an aircraft floor, while a partial area of the second furnishing is movable and may free a space.

According to a further exemplary embodiment of the present invention, the second furnishing has a displacement device, such as a friction bearing, for displacing the at least one part of the second furnishing. The second furnishing may completely free the spatial area required of it. Using a slide rail, it may be possible for a furnishing, particularly a partition wall, to be displaced into a free area at a time in which it is not required. The area into which the second furnishing is displaced may be free, since it is not required or used at the time in which the space claimed by the second furnishing is required.

According to a further exemplary embodiment of the present invention, the displacement device is a seat rail. Particularly in an aircraft in which monuments and/or furnishings may be mounted on seat rails, the furnishing may comprise a displacement device or a friction bearing which fits on a seat rail. The mounting of the second furnishing may thus be simplified.

According to a further exemplary embodiment of the present invention, an arrangement is specified in which the second furnishing has an elastic element for pivoting the at least one part of the second furnishing. The elastic element may be positioned between parts of the second furnishing.

The elastic element may be a rubber element or a spring element, for example, so that a part of the second furnishing which has an elastic element may be slightly inclined, tilted, or displaced. A deflection of the part of the second furnishing may thus occur. This deflection may occur against the return force of the elastic element. Due to the return force of the elastic element, the part of the second furnishing is moved back into its starting position when the part of the second furnishing is released.

A displacement device, a pivot device, a joint, a friction bearing, or an elastic element may be easily retrofitted in an existing furnishing. By exerting pressure or coupling on the at least one part of the first furnishing, a movement of the at least one part of the second furnishing may occur. This movement may be an inclination or a linear movement, for example.

In particular, an aircraft cabin which is already existing and/or equipped with conventional passenger seats or an aircraft interior may be provided with the arrangement according to the present invention.

According to a further exemplary embodiment of the present invention, an arrangement is specified in which the second furnishing has at least one upper part and at least one lower part. The at least one upper part of the second furnishing may be lowered into the at least one lower part of the second furnishing. The upper part is further from the attachment, such as a floor surface, than the lower part. By lowering the at least one upper part into the at least one lower part of the furnishing, a spatial area above the lower part of the second furnishing may be freed. The height, particularly the length, of the second furnishing may thus be reduced telescopically. The space thus obtained may be used for a part of the first furnishing, particularly for the movement of a part of the first furnishing.

According to a further exemplary embodiment of the present invention, a means of transportation is specified in which the second furnishing is positioned in front of the exit and/or in an exit area of the means of transportation. In particular, a means of transportation is specified in which the second furnishing is positioned between a seat and an exit of the means of transportation.

In a means of transportation, it may be necessary to keep an exit free, particularly an exit door or an entry or exit area, during a specific time, such as the entry or exit time. The area kept free may be unused during a usage time of the means of transportation, for example. The at least one part of the second furnishing may use the exit area to free the space, if the second furnishing is positioned in front of the exit area. For this purpose, the at least one movable part of the second furnishing may be displaced or deflected into the exit area in a time in which the exit area is not used.

Through this displacement of the at least one part of the second furnishing, a movement of the at least one part of the first furnishing in the direction of the second furnishing may be made possible. This may be particularly advantageous if the means of transportation is an aircraft. In an aircraft, flight attendants may use the flight attendant seats attached in the exit areas of the aircraft. The time in which the flight attendants use the flight attendant seats is the takeoff time and/or the landing time, i.e., the time during takeoff and landing. During the flight, the flight attendant seats are normally not used. They may be displaced and/or inclined into an area of the exit during this time. Additional space for seats, particularly passenger seats may thus be provided.

BRIEF DESCRIPTION OF THE DRAWINGS

In the following, exemplary embodiments of the present invention are described with reference to the figures, in which.

The illustrations in the figures are schematic and are not to scale. In the following description of FIG. 1 through FIG. 7, identical reference numbers are used for identical or corresponding elements.

DETAILED DESCRIPTION

Figure 1:
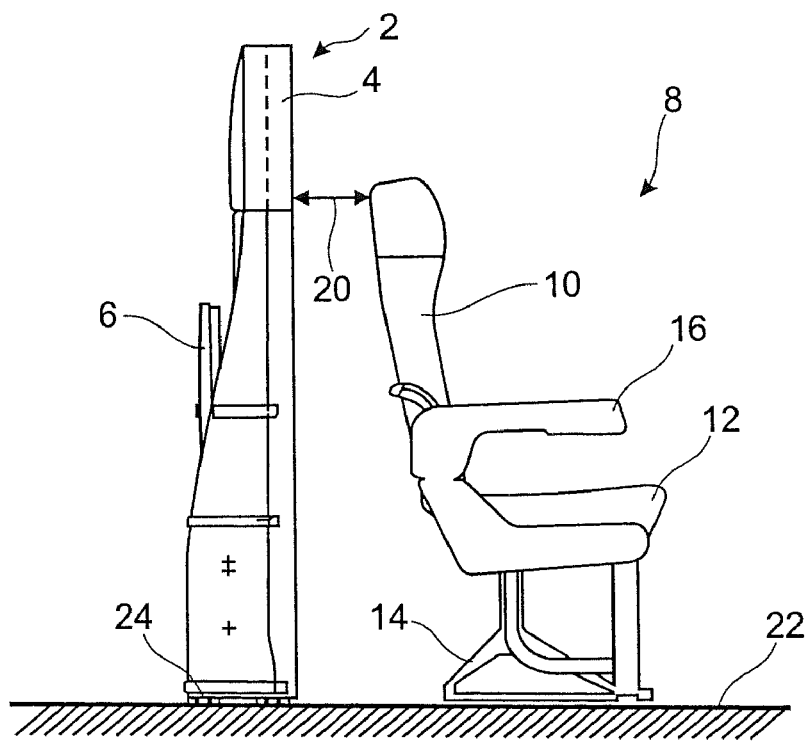
FIG. 1 shows an arrangement of a first and a second furnishing according to an exemplary embodiment of the present invention.

FIG. 1 shows the arrangement of a first furnishing 8 and a second furnishing 2. The first furnishing 8 is a passenger seat 8 and the second furnishing 2 is a flight attendant seat 2. The flight attendant seat 2 has a partition wall 4 and a seat surface 6. The passenger seat 8 and the flight attendant seat 2 are mounted on the floor 22 of an aircraft. The passenger seat 8 and the flight attendant seat 2 are positioned at a distance 20 from one another. In this case, the flight attendant seat 2 is behind the passenger seat 8. Behind is defined in this case as the direction located in the back area of a passenger during normal usage of the passenger seat 8.

The passenger seat 8 is mounted on the floor 22 using a pedestal 14. The armrest 16 and seat cushion 12 are mounted on the pedestal 14. A passenger may sit on the seat cushion 12. In this case, his viewing direction points to the front. The back rest 10 is movably mounted on the armrest 16. The back rest 10 may be moved in the direction of the flight attendant seat 2.

The distance 20 defines the movement space of the back rest 10 of the passenger seat 8. During a movement of the back rest 10 in this area 20, there is no obstruction of the back rest 10 by the flight attendant seat 2.

FIG. 1 shows a seated position. The back rest 10 of the passenger seat 8 is in its upright position, i.e., it is essentially perpendicular to the floor surface 22. A fixed distance 20 thus results between back rest 10 and flight attendant seat 2, in particular the partition wall 4 of the flight attendant seat 2. The flight attendant seat 2 has a seat surface 6. For example, the second furnishing 2 may have a flap 6 which is folded down by the weight of a user. If the weight of a user falls away, the flap 6 may fold away automatically and cause a movement of at least a part of the second furnishing 2. However, an automatic mechanism may also be a trigger device, for example, particularly a button or a lever, after whose actuation the movement of the part of the second furnishing 2 is triggered.

In FIG. 1, the seat surface 6 is perpendicular to the floor 22. The position of the seat surface 6 perpendicular to the floor 22 means that the flight attendant seat 2 is not used. To use the flight attendant seat 2, the seat surface 6 is folded parallel to the floor surface 22. A flight attendant may thus sit on the seat surface 6.

The distance of the fixed mounting of the flight attendant seat 2 having attachment 24 on the floor 22 and the fixed mounting of the passenger seat 8 using floor frame 14 on the floor 22 determines the distance 20 between back rest 10 and partition wall 4. Distance 20 is the clearance zone in whose extension the back rest may be moved in the direction of partition wall 4.

The clearance zone required for inclining the back rest 10 results from the dimensions of the passenger seat 8. At a height of the back rest 10 of approximately 1100 mm, a space requirement 20 of approximately 150 to 230 mm results. The clearance zone 20 may restrict the required clearance zone for the complete inclination of the back rest 10 because of the mounting of the passenger seat 8 and the flight attendant seat 2, which is too close.

The seat surface 6 of the flight attendant seat 2 is in a horizontal position during a first mode of operation, so that the cabin personnel and/or a flight attendant may take a seat on this seat surface 6.

Figure 2:
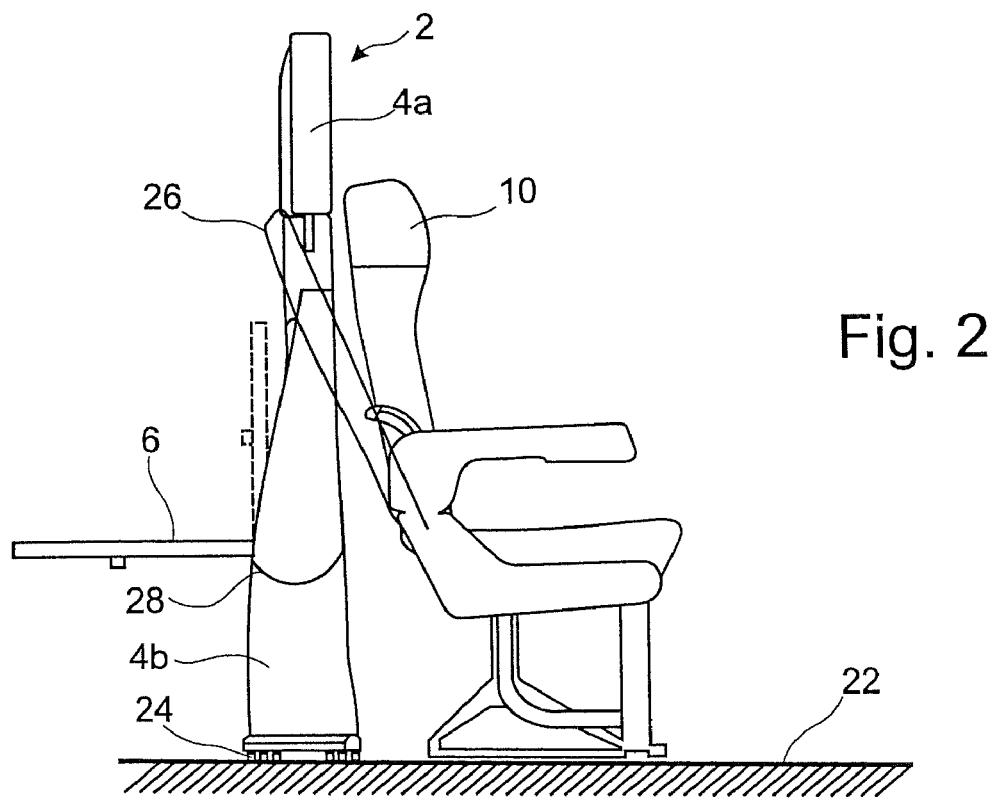
FIG. 2 shows a flight attendant seat and a passenger seat in a first mode of operation according to an exemplary embodiment of the present invention.

FIG. 2 also shows the seat back rest 26 indicated in a completely inclined position. The flight attendant seat 2 is divided into two separate parts by the joint 28. The two parts of the flight attendant seat are an upper part 4a and a lower part 4b. It may be seen that there is an overlap of the back rest 26 and upper part 4a of the flight attendant seat 2. In order to allow the complete inclination of the back rest 26, the upper part 4a of the flight attendant seat 2 must be folded away in order to free a spatial area for the back rest 26. In other embodiments, the upper part 4a of the flight attendant seat 2 may be lowered into the lower part 4b, as depicted by arrow A, thus reducing the height of the flight attendant seat telescopically. The space thus obtained may be used for a part of the first furnishing, particularly for the movement of a part of the first furnishing.

Figure 3:
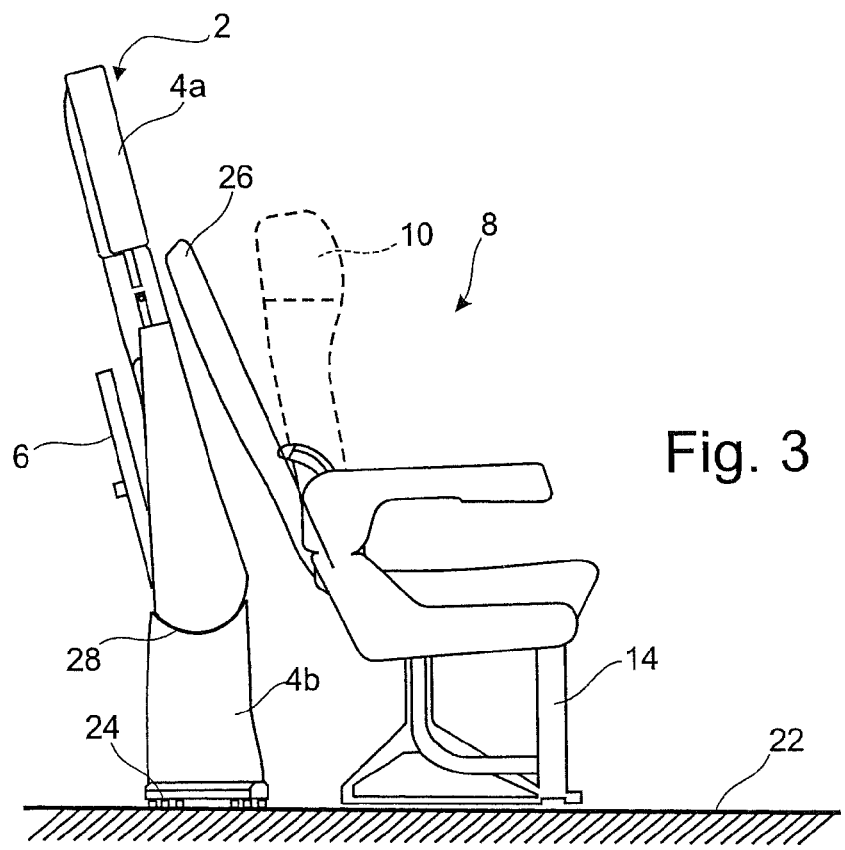
FIG. 3 shows a flight attendant seat and a passenger seat in a second mode of operation according to an exemplary embodiment of the present invention.

FIG. 3 shows an inclination of the upper part 4a counterclockwise around the joint 28 of the flight attendant seat 2. The lower part 4b of the flight attendant seat 2 is fixed on the floor 22 using attachment 24 and is not inclined.

The passenger seat 8 is also fixed on the floor 22 using the pedestal 14. The distance between the lower part 4b of the flight attendant seat 2 and the pedestal 14 is thus permanently predefined. Via inclination of the upper part 4a, space may be provided above the lower part 4b of the flight attendant seat 2 in order to allow the complete inclination of the back rest 26. FIG. 3 shows the arrangement in a cruise mode or during flight operation.

During the flight in a second mode of operation, the flight attendants perform their activities and the flight attendant seat 2 remains free. This means that the seat surface 6 is folded essentially parallel to the upper part 4a of the flight attendant seat 2. The inclination of the back rest 26 in the direction of flight attendant seat 2 may be selected individually between the maximum inclination 26 and the vertical position 10 of the back rest as desired by the passenger. There is no restriction in relation to other passenger seats at other locations. This means that the flight attendant seat 2 and/or the upper part 4a of the flight attendant seat 2 does not obstruct the inclination of the back rest 26.

The upper part 4a may be inclined automatically when the seat surface 6 is folded back into the position essentially parallel to the upper part 4a. The lock of the flight attendant seat in the first mode of operation may be performed by folding down the seat surface of the flight attendant. This principle does not have to be operated by the flight attendant personnel. A coupling between the back rest 10 and upper part 4a of the flight attendant seat 2 is also possible, so that the upper part 4a of the flight attendant seat 2 is moved simultaneously with inclination of the back rest 10. Like a flight attendant seat 2, a partition wall may also be equipped with a buckle joint 28.

Figure 4:
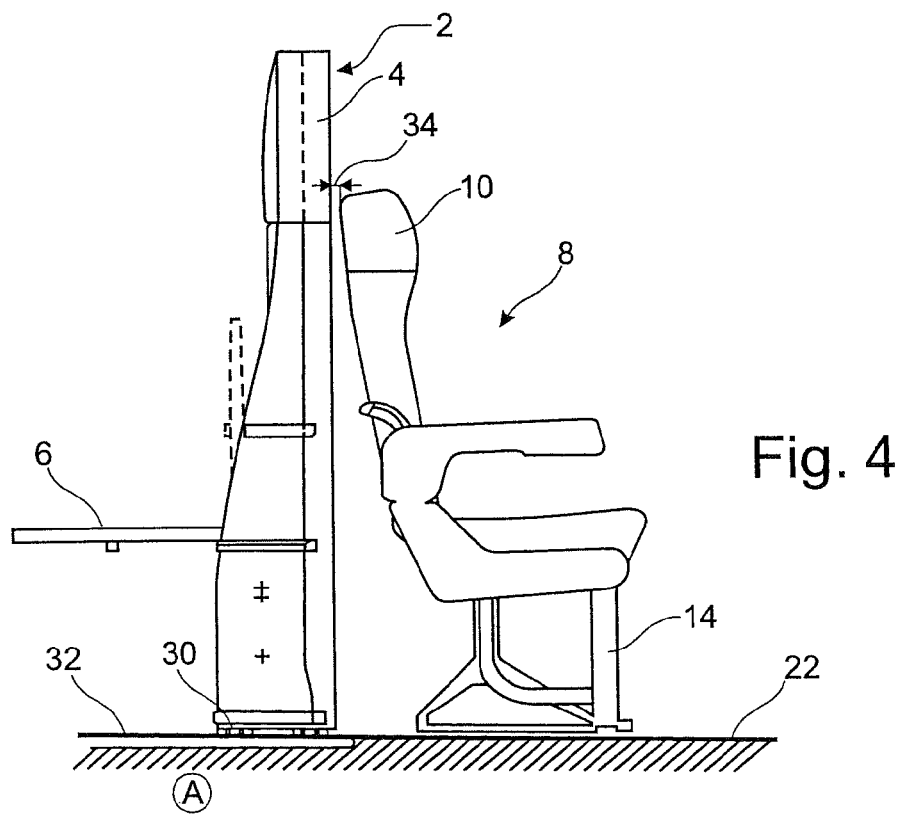
FIG. 4 shows a further arrangement of a flight attendant seat and a passenger seat in a first mode of operation according to an exemplary embodiment of the present invention.

FIG. 4 shows the passenger seat 8 and the flight attendant seat 2 in the first mode of operation. The first mode of operation identifies the takeoff or landing phase of an aircraft. In this case, the seat surface 6 is folded horizontally to the aircraft floor 22. A flight attendant may take a seat on the seat surface 6 in this phase. The flight attendant seat 2 is positioned on the seat rail 32 using linear or friction bearings 30. In the first mode of operation, the flight attendant seat is in the position on the seat rail 32 identified by the letter A.

The back rest 10 of the passenger seat and the partition wall 4 of the flight attendant seat 2 thus have a distance 34. The passenger seat 8 is attached using pedestal 14 to the aircraft floor 22 or also to the seat rail 32.

The seat rail 32 corresponds to a seat rail typical in aircraft construction and is positioned below the surface of the floor 22. The friction bearing 30 allows displacement of the complete flight attendant seat 2 parallel to the floor surface 22. The flight attendant seat 2 is attached in position A using a constructively secure lock. This secure lock may be easily opened by an operator, however, in order to allow easy displacement of the flight attendant seat 2.

Figure 5:
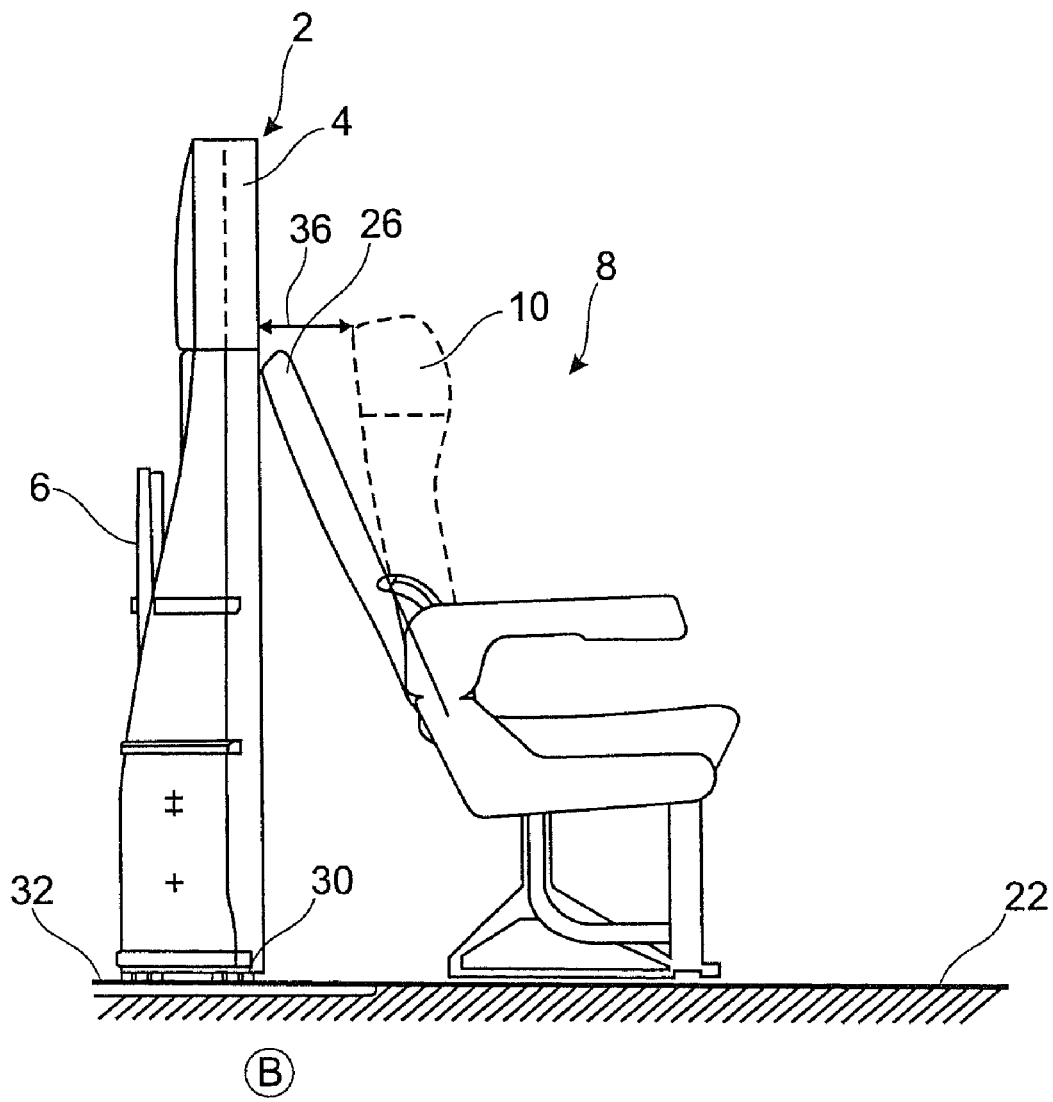
FIG. 5 shows a further arrangement of a flight attendant seat and a passenger seat in a second mode of operation according to an exemplary embodiment of the present invention.

FIG. 5 shows the arrangement according to the present invention of the passenger seat 8 and the flight attendant seat 2 in a second mode of operation. The second mode of operation, for flight operation or cruise mode, is to allow inclination of the back rest 26 of the passenger seat 8. In order to obtain the clearance zone 36 for the inclination of the back rest 26, the flight attendant seat 2 is displaced during the flight into position B. The distance 36 corresponds to the maximum inclination of the back rest 26 from the vertical position.

The distance or clearance zone 36 in relation to the vertical inclination of the back rest 10 is greater in this position than the distance 34 in position A. Position B may be located in a work space or an exit space not used during the flight phase. During entry into and/or exit out of the aircraft, passengers near an entry or exit are to have sufficient movement freedom to walk and move. The rest 10 of a passenger seat remains in its vertical position.

For comfortable entry and exit, a specific space is provided for the aircraft attendant seat near the passenger seat. The entry/exit area is thus enlarged.

However, during the flight, the space in front of the exit is not used. Therefore, the flight attendant seat 2 may be displaced and/or moved into the space, in order to thus provide a clearance zone 36 for inclining the back rest 26. In position B, the flight attendant seat 2 is also attached using a constructively secure lock. The adjustment from position A into position B and vice versa may also occur automatically. During the flight, the flight attendant seat 2 is not used by the flight attendant. Therefore, the seat surface 6 is folded against the partition wall 4 of the flight attendant seat in flight operation.

A linear bearing has the advantage that during a displacement of the entire flight attendant seat 2, the flight attendant seat 2 is usable unrestrictedly.

Figure 6:
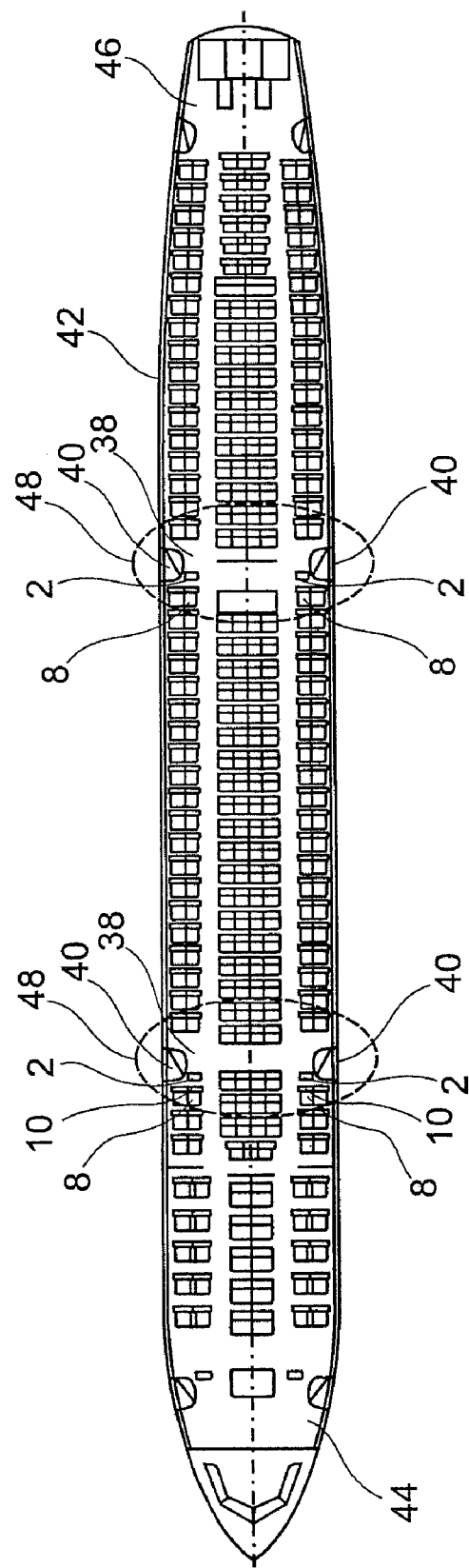
FIG. 6 shows a top view of the interior of an aircraft having an arrangement according to an exemplary embodiment of the present invention.

FIG. 6 shows the top view of an interior of an aircraft fuselage 42. Passenger seats are positioned in seat rows between the aircraft bow area 44 and the aircraft stern area 46. Two diametrically opposite doors 40 and an entry/exit or working area 38 are located in each of the two occupancy areas 48. Each occupancy area 48 also contains an arrangement of a passenger seat 8 having a flight attendant seat 2 positioned between passenger seat 8 and entry/exit area 38.

In order to provide the largest possible entry and exit area 38, the flight attendant seat 2 is positioned as close as possible to the passenger seat 8. The flight attendant seat 2 or cabin attendant seat 2 thus obstructs a maximum inclination of the back rest 26 of the passenger seat 8. In order to allow the inclination of the back rest 10 of the passenger seat 8 during the flight, the flight attendant seat 2 or part of the flight attendant seat 2 may be displaced and/or inclined into the entry or exit area 38, particularly the occupancy area 48.

Figure 7:
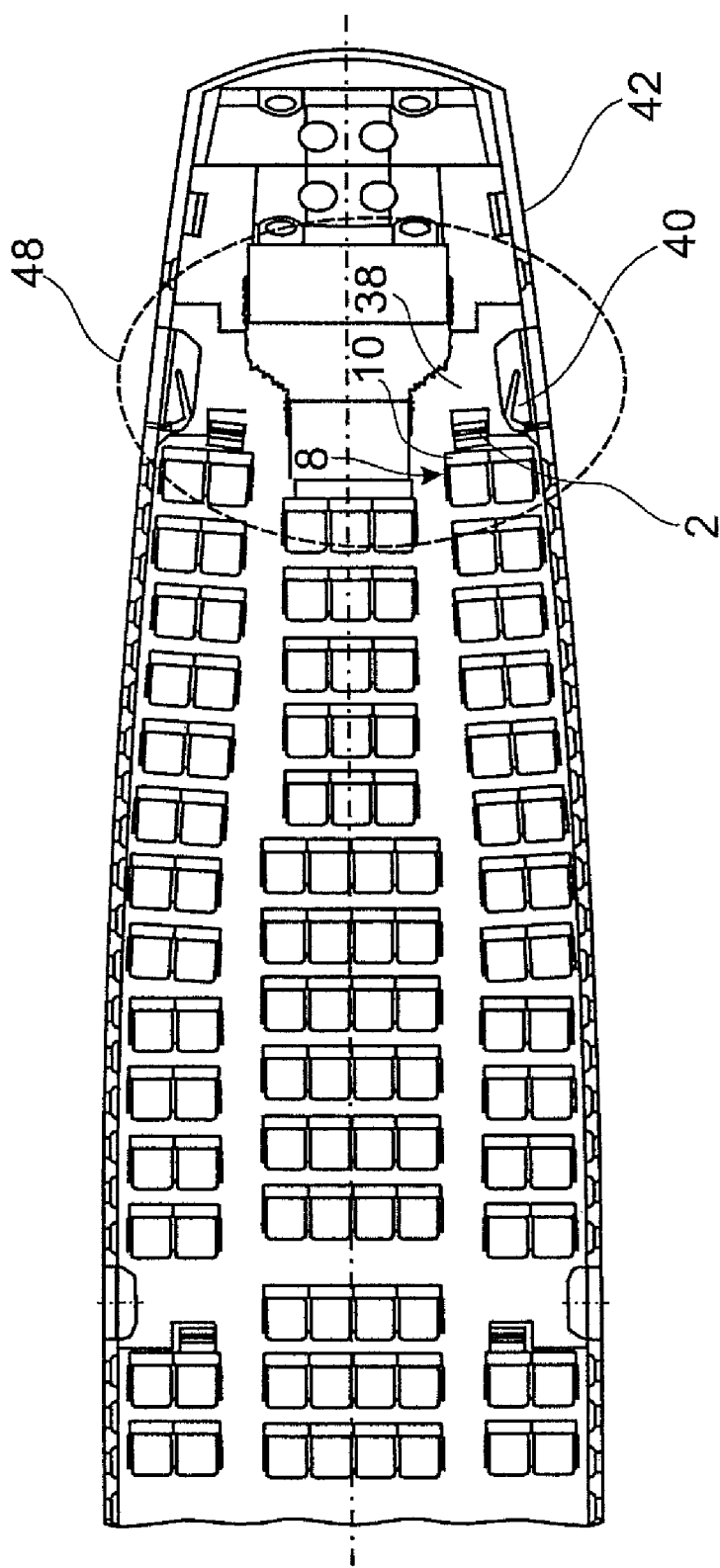
FIG. 7 shows a detail of an aircraft interior having an arrangement according to an exemplary embodiment of the present invention.

FIG. 7 shows a detail from FIG. 6. The aircraft fuselage 42 having the entry/exit doors 40 is shown. To board the aircraft, the entry/exit area 38 is used by the passengers. The free surface of the entry/exit area 38 is to be selected as largest possible in order to make the entry/exit of the passengers easier. Therefore, the flight attendant seat 2 is positioned as close as possible to the passenger seat 8. During the entry phase, the back rest 10 of the passenger seat 8 is in an upright position.

During the flight phase, the entry area 38 is not used. Therefore, the flight attendant seat 2 or part of the flight attendant seat 2 may use the entry/exit area 38 and/or the work space 38.

In addition, it is to be noted that "comprising" does not exclude other elements or steps and "a" or "an" does not exclude multiples. Furthermore, it is to be noted that features or steps which have been described with reference to one of the above exemplary embodiments may also be used in combination with other features or steps of other exemplary embodiments described above. Reference numbers in the claims are not to be viewed as a restriction.

Although the invention herein has been described with reference to particular embodiments, it is to be understood that these embodiments are merely illustrative of the principles and applications of the present invention. It is therefore to be understood that numerous modifications may be made to the illustrative embodiments and that other arrangements may be devised without departing from the spirit and scope of the present invention as defined by the appended claims.

The invention claimed is:

1. An arrangement comprising:
a passenger seat having a backrest movably mounted on a pedestal; and
a flight attendant seat having an upper part and a lower part divided by a pivot device and having a seat surface,
wherein the passenger seat is mounted on a floor using the pedestal and wherein the flight attendant seat is mounted to the floor using the lower part such that the distance between the lower part of the flight attendant seat and the pedestal is permanently defined by a fixed distance;
wherein the passenger seat and the flight attendant seat are adapted to be transferred from a first mode of operation into a second mode of operation;
wherein during the first mode of operation, the passenger seat is configured to accommodate a first person thereon and the flight attendant seat is configured to accommodate a second person thereon by having the seat surface thereof extended parallel to the floor;
wherein for the transition of the passenger seat and the flight attendant seat from the first mode of operation into the second mode of operation the backrest of the passenger seat is movable in the direction of the flight attendant seat;
wherein during the second mode of operation, the upper part of the flight attendant seat is movable to free a space above the lower part of the flight attendant seat to receive the backrest of the passenger seat; and
wherein in the second mode of operation the seat surface of the flight attendant seat is folded parallel to the upper part of the flight attendant seat.

2. The arrangement of claim 1,
wherein the flight attendant seat is implemented to automatically free the space if the backrest of the passenger seat is moved in the direction of the flight attendant seat.

3. The arrangement of claim 1,
wherein a movement of the upper part of the flight attendant seat is coupled to a movement of the backrest of the passenger seat.

4. The arrangement of claim 1,
wherein the flight attendant seat has a partition wall.

5. The arrangement of claim 4,
wherein the partition wall has a side facing toward the passenger seat and a side facing away from the seat, wherein the seat surface being positioned on the side of the partition wall facing away from the passenger seat.

6. The arrangement of claim 1,
wherein the flight attendant seat has a displacement device for displacing at least the upper part of the flight attendant seat.

7. The arrangement of claim 6,
wherein the displacement device is a seat rail.

8. The arrangement of claim 1,
wherein the flight attendant seat has an elastic element for pivoting the upper part of the flight attendant seat.

9. The arrangement of claim 1,
wherein the upper part of the flight attendant seat being able to be lowered into the lower part of the flight attendant seat.

10. The arrangement of claim 1,
wherein if the seat surface of the flight attendant seat is folded away the upper part of the flight attendant seat is moved.

11. A transportation apparatus comprising:
a passenger seat having a backrest movably mounted on a pedestal; and
a flight attendant seat having an upper part and a lower part divided by a pivot device and having a seat surface,
wherein the passenger seat is mounted on a floor using the pedestal and wherein the flight attendant seat is mounted to the floor using the lower part such that the distance between the lower part of the flight attendant seat and the pedestal is permanently defined by a fixed distance;
wherein the passenger seat and the flight attendant seat are adapted to be transferred from a first mode of operation into a second mode of operation;
wherein during the first mode of operation, the passenger seat is configured to accommodate a first person thereon and the flight attendant seat is configured to accommodate a second person thereon by the seat surface thereof folded parallel to the floor;
wherein for the transition of the passenger seat and the flight attendant seat from the first mode of operation into the second mode of operation the backrest of the passenger seat is movable in the direction of the flight attendant seat; and
wherein during the second mode of operation, the upper part of the flight attendant seat is movable to free a space above the lower part of the flight attendant seat to receive the backrest of the passenger seat; and
wherein in the second mode of operation the seat surface of the flight attendant seat is folded parallel to the upper part of the flight attendant seat.

* * * * *